United States Patent [19]
Fukushima et al.

[11] Patent Number: 5,144,558
[45] Date of Patent: Sep. 1, 1992

[54] ACTIVELY CONTROLLED AUTOMOTIVE SUSPENSION SYSTEM WITH ADJUSTABLE ROLLING-STABILITY AND/OR PITCHING-STABILITY

[75] Inventors: Naoto Fukushima; Hirotsugu Yamaguchi; Yohsuke Akatsu; Sunao Hano, all of Kanagawa, Japan

[73] Assignee: Nissan Motor Company, Limited, Yokohama, Japan

[21] Appl. No.: 657,946

[22] Filed: Feb. 21, 1991

Related U.S. Application Data

[63] Continuation of Ser. No. 455,792, Dec. 20, 1989, abandoned, which is a continuation of Ser. No. 61,368, Jun. 15, 1987, abandoned.

[30] Foreign Application Priority Data

Jun. 13, 1986 [JP] Japan .................. 61-137875

[51] Int. Cl.$^5$ .............................. B60G 17/00
[52] U.S. Cl. .................. 364/424.05; 280/707
[58] Field of Search .......... 280/707, 6.12, 840, 280/703, DIG. 1; 364/424.05

[56] References Cited

U.S. PATENT DOCUMENTS

| | | | |
|---|---|---|---|
| 3,124,368 | 3/1964 | Corley et al. | 280/6 |
| 3,778,081 | 12/1973 | Takahashi et al. | 280/112 A |
| 4,373,744 | 2/1983 | Glaze | 280/707 |
| 4,621,833 | 11/1986 | Soltis | 280/707 |
| 4,666,013 | 5/1987 | Shibahata et al. | 180/141 |
| 4,712,807 | 12/1987 | Kurosawa | 280/707 |
| 4,761,022 | 8/1988 | Ohashi et al. | 280/703 |
| 4,809,179 | 2/1989 | Klinger et al. | 364/424.05 |
| 4,907,154 | 3/1990 | Yasuda et al. | 364/424.05 |
| 4,922,427 | 5/1990 | Yokote et al. | 364/424.05 |

FOREIGN PATENT DOCUMENTS

| | | |
|---|---|---|
| 0114757 | 8/1984 | European Pat. Off. . |
| 0172272 | 2/1986 | European Pat. Off. . |
| 0193124 | 9/1986 | European Pat. Off. . |
| 2137849 | 12/1972 | France . |
| 60-64014 | 4/1985 | Japan . |
| 60-500662 | 5/1985 | Japan . |
| 61-64510 | 4/1986 | Japan . |
| 61-64512 | 4/1986 | Japan . |
| 61-500957 | 5/1986 | Japan . |

OTHER PUBLICATIONS

Hamilton, "Computer-Optimized Adaptive Suspension Technology (COAST)," IEEE Transactions on Industrial Electronics, vol. IE-32, No. 4, Nov. 1985, pp. 355-363.

Patent Abstracts of Japan, vol. 9, No. 202 (M-405) (1925), Aug. 20, 1985 JP-A-60 64 014.

Patent Abstracts of Japan, vol. 10, No. 231 (M-506) (2287), Aug. 12, 1986 JP-A-61 64 512.

*Primary Examiner*—Thomas G. Black
*Attorney, Agent, or Firm*—Foley & Lardner

[57] ABSTRACT

An actively controlled suspension system includes a vehicular rolling detecting component to adjust the suspension characteristics for suppressing the vehicular rolling. In addition, the actively controlled suspension control system may be provided for adjusting roll-stabilization load distribution between the front and rear suspension systems for adjusting vehicular driving stability by suppressing rolling and pitching of the vehicle body.

14 Claims, 8 Drawing Sheets

ACTIVELY CONTROLLED AUTOMOTIVE SUSPENSION SYSTEM WITH ADJUSTABLE ROLLING-STABILITY AND/OR PITCHING-STABILITY

This application is a continuation of application Ser. No. 07/455,792, filed Dec. 20, 1989, now abandoned, which is a continuation of application Ser. No. 061,368, filed Jun. 15, 1987, now abandoned.

BACKGROUND OF THE INVENTION

1. Field of the Invention

The present invention relates generally to an actively controlled suspension system which has adjustable suspension characteristics according to the vehicle driving condition. More specifically, the invention relates to an actively controlled suspension system which has adjustable rolling stability and/or pitching stability.

2. Description of the Background Art

Generally, a typical construction of a suspension assembly comprises a suspension coil and shock absorber and is interposed between a vehicle body and a suspension member supporting a vehicular wheel, in order to constitute an automotive suspension system with a suspension member. The suspension coil spring generally resists load applied to maintain the vehicle body and the road wheel in a predetermined positional relationship to each other. On the other hand, the shock absorber is intended to damp or absorb vibrations transmitted between the vehicle body and the road wheel. The automotive suspension system may be further provided with a roll-stabilizer for suppressing vehicular rolling motion.

Some of the many kinds of automotive suspension systems include hydraulic circuits associated with fluid chambers in hydraulic shock absorbers for the controlling balance between the fluid pressures in the fluid chambers according to the relative displacement between the vehicle body and road wheel. Such hydraulic circuits include a fluid pressure source supplying working fluid at a given pressure to the circuits, and pressure control valves. The pressure control valves hydraulically connect and disconnect the fluid pressure source to the fluid chambers of the hydraulic shock absorbers for controlling the pressure supply. The pressure control valves are controlled by an electric or electronic control system which switches the various valve positions to selectively introduce or drain fluid pressure into or from the fluid chambers so as to generate a damping force which suppresses vehicle body and road wheel vibrations.

These conventional positively controlled suspension systems encounter various defects and have not been at all satisfactorily capable of suppressing vibrations or bouncing of the vehicle body in order to ensure riding comfort. Specifically, conventional systems produce a damping force by means of an orifice in the hydraulic circuit. However, due to flow resistance through the orifice, fluid pressure differences between the fluid chambers in the shock absorber cannot be easily balanced. When the balance is disturbed, the shock absorber tends to transmit vibration of the road wheel to the vehicle body which degrades riding comfort.

In order to provide an improvement, a positively or actively controlled automotive suspension system was proposed in European Patent First Publication 01 93 124, published on Sep. 3, 1986, and assigned to the common owner of the present invention. The proposed positively controlled automotive suspension system comprises a hollow cylinder defining a chamber, a piston thrustingly received within the chamber of the cylinder and defining therein first and second fluid chambers, both filled with a working fluid the piston being free to move axially with the chamber, a fluid pressure source, a hydraulic circuit connecting the first and second fluid chamber and the fluid pressure source, a pressure control valve disposed within the hydraulic circuit and adapted to selectively establish and block fluid communication between the first and second fluid chambers and the fluid pressure source, means responsive to relative displacement between a vehicle body and road wheel assembly out of a predetermined normal range, for controlling the pressure control valve so as to adjust the fluid pressure in the first and second fluid chambers in order to adjust the relative distance between the vehicle body and the road wheel assembly back to within the predetermined normal range, and means responsive to bounding and rebounding motion of the road wheel relative to the vehicle body, for controlling the pressure control valve so as to adjust the fluid pressure in the first and second fluid chambers to assist smooth displacement of the piston within the cylinder thereby absorbing bounding and rebounding energy which would otherwise be transmitted to the vehicle body.

Another type of active suspension system has been disclosed in 'Autocar' published by Haymarket Publishing Ltd., on Sep. 10, 1987. The disclosed system includes a single cylinder actuator which has a cylinder tube connected to the vehicle body and a piston with a piston rod connected to the suspension member. The cylinder actuator is connected to a hydraulic pressure source via an electromagnetic valve. The hydraulic cylinder is also connected to an accumulator via an orifice. With this construction, the pressurized fluid to absorb road shock and suppress attitude change of the vehicle body is supplied from the pressure source via the pressure control valve. This lower response of pressure control in the hydraulic actuator.

On the other hand, an automotive suspension system which has adjustable roll-stabilization ability was disclosed in the Japanese Patent First Publication (Tokkai) Showa 60-25201. The disclosed suspension system allows mechanical adjustment of the roll-stabilization ability by providing mechanical coupling in a roll-stabilizer. However, this adjustable roll stabilizer cannot preform precise and wide range roll-stability adjustment.

SUMMARY OF THE INVENTION

It is an object of the present invention to provide an actively controlled suspension system which can provide roll and/or pitching stabilization ability equivalent to the conventional mechanical roll-stabilizer.

Another object of the invention is to provide an actively controlled suspension system which can provide wide adjustable range and precise roll and/or pitching-stability control.

A further object of the invention is to provide an actively controlled suspension system which allows adjustment of the vehicular cornering characteristics by adjusting roll-stability and pitching stability distribution between the front and rear suspension systems.

In order to accomplish the aforementioned and other objects, an actively controlled suspension system according to the present invention, includes a vehicular rolling detecting component to adjust the suspension characteristics for suppressing the vehicular rolling. In addition, the actively controlled suspension control system may be provided with means for adjusting roll-stabilization load distribution between the front and rear suspension systems for adjusting vehicular driving stability by suppressing rolling and pitching of the vehicle body.

According to one aspect of the invention, an actively controlled suspension system for an automotive vehicle comprises pressure means, incorporated in each of suspension systems in an automotive vehicle and disposed between a vehicle body and a suspension member in an associated suspension system, for supporting the vehicle body on the suspension member, each the pressure means including a variable pressure chamber varying the pressure of a working fluid therein according to relative bounding and rebounding motion of vehicle body and said suspension member, a sensor means for monitoring kinematic acceleration exerted on the vehicle body to cause a change of attitude thereof, the sensor means producing an acceleration indicating sensor signal indicative thereof, a controller receiving the sensor signal to detect vehicular attitude change based thereon, and deriving a control signal based on the detected attitude change of the vehicle body for adjusting the fluid pressure in each of the variable pressure chambers for suppressing the attitude change of the vehicle body in rolling and pitching directions.

In the preferred embodiment, the sensor means monitoring a lateral acceleration to be exerted on the vehicle body to produce a lateral acceleration indicating signal, and the controller, are responsive to the lateral acceleration indicating signal to perform rolling suppressive active suspension control for suppressing rolling motion on the vehicle body by adjusting fluid pressure in respective variable pressure chambers. The magnitudes of the increasing of the fluid pressure in one of the first and second variable pressure chambers substantially corresponds with the magnitude of decreasing of the fluid pressure in the other of the first and second variable pressure chambers. In the alternative, the sensor means comprises a vehicle speed sensor for producing a vehicle speed indicating signal and a steering angle sensor for producing a steering angle signal, and an arithmetic means for deriving a projected lateral acceleration based on the vehicle speed indicating signal value and the steering angle indicating signal value.

In a further alternative embodiment, the sensor means monitoring a pitching acceleration to be exerted on the vehicle body to produce a pitching acceleration indicating signal and the controller, is responsive to the pitching acceleration indicating signal to perform pitching suppressive active suspension control for suppressing pitching motion on the vehicle body by adjusting fluid pressure in respective variable pressure chambers.

According to another aspect of the invention, an actively controlled suspension system for an automotive vehicle comprises a first fluid pressure means provided at front portion of a first lateral side of the vehicle body and interposed between a vehicle body and a suspension member rotatably supporting a road wheel, the fluid pressure means having a first variable pressure chamber, a second fluid pressure means provided at the front portion of a second lateral side of the vehicle body and interposed between a vehicle body and a suspension member rotatably supporting a road wheel, the fluid pressure means having a first variable pressure chamber, a third fluid pressure means provided at rear portion of a first lateral side of the vehicle body and interposed between a vehicle body and a suspension member rotatably supporting a road wheel, the fluid pressure means having a first variable pressure chamber, a third fluid pressure means provided at rear portion or a first lateral side of the vehicle body and interposed between a vehicle body and a suspension member rotatably supporting a road wheel, the fluid pressure means having a first variable pressure chamber, a fourth fluid pressure means provided at the rear portion of a second lateral side of the vehicle body and interposed between a vehicle body and a suspension member rotatably supporting a road wheel, the fluid pressure means having a first variable pressure chamber, a sensor means for monitoring kinematic acceleration exerted on the vehicle body to cause a change of attitude thereof, the sensor means producing an acceleration indicating sensor signal indicative thereof, and a controller receiving the sensor signal to detect vehicular attitude change on based thereon, and deriving a control signal based on the detected attitude change of the vehicle body for adjusting the fluid pressure in each of the variable pressure chambers in the first, second, third and fourth pressure means for suppressing attitude change of the vehicle body in rolling and pitching directions.

The sensor means may monitor a lateral acceleration to be exerted on the vehicle body to produce a lateral acceleration indicating signal and the controller is responsive to the lateral acceleration indicating signal to perform rolling suppressive active suspension control for suppressing rolling motion on the vehicle body by adjusting fluid pressure in respective variable pressure chambers. The sensor means may comprise a vehicle speed sensor for producing a vehicle speed indicating signal and a steering angle sensor for producing a steering angle signal, and an arithmetic means for deriving a projected lateral acceleration based on the vehicle speed indicating signal value and the steering angle indicating signal value.

In the alternative embodiment, the sensor means monitoring a pitching acceleration to be exerted on the vehicle body to produce a pitching acceleration indicating signal and the controller, is responsive to the pitching suppressive active suspension control for suppressing pitching motion on the vehicle body by adjusting fluid pressure in respective variable pressure chambers.

BRIEF DESCRIPTION OF THE DRAWINGS

In the drawings:

FIGS. 3(A) and 3(B) are enlarged sections showing the detail of the hydraulic pressure control valve of FIG. 2, in which, FIG. 3(A) shows the valve position softening the shock absorber and FIG. 3(B) shows the valve position hardening the shock absorber;

DESCRIPTION OF THE PREFERRED EMBODIMENT

Figure 1:
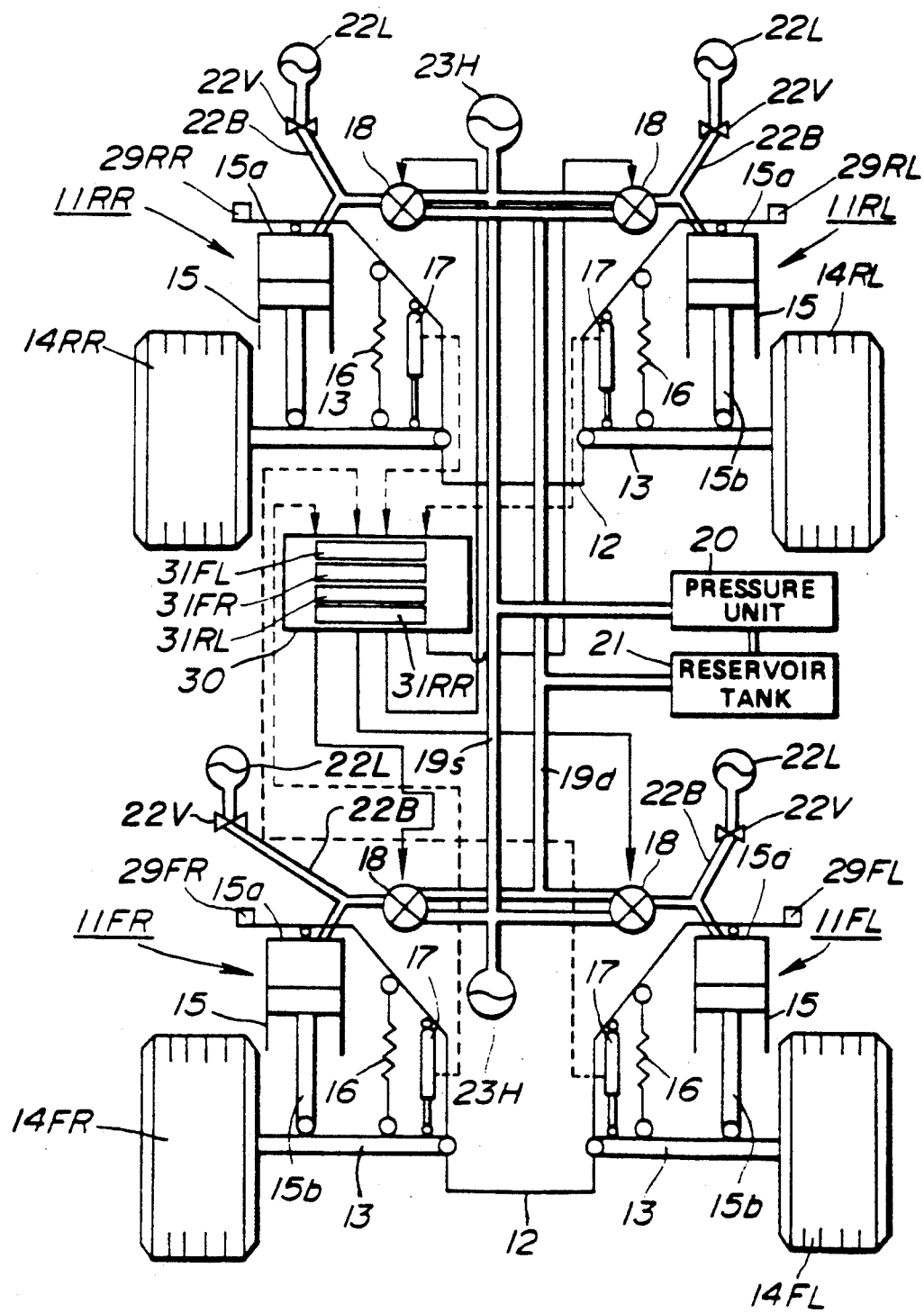
FIG. 1 is a diagrammatic illustration showing the overall construction of the preferred embodiment of an automotive suspension system with a control system actively controlling the suspension system according to the present invention.

Referring now to the drawing, particularly to FIG. 1, a vehicle has four suspension systems 11FL, 11FR, 11RL, and 11RR for respectively suspending vehicle body 12 on front-left, front-right, rear-left and rear-right road wheels 14FL, 14FR, 14RL and 14RR. Each of the front-left, front-right, rear-left and rear-right suspension systems 11FL, 11FR, 11RL and 11RR are constructed to form a so-called active suspension system which adjusts working fluid pressure in the suspension system for adjusting stiffness and damping characteristics of the suspension system in a positive manner for absorbing uncomfortable, relatively high frequency and relatively small magnitude vibration input from the road wheels 14FL, 14FR, 14RL and 14RR and suppressing attitude change of a vehicle body.

Each suspension system 11FL, 11FR, 11RL and 11RR comprises a suspension member 13, such as a suspension link, a suspension arm and so forth, and a suspension assembly 15 which is interposed between the vehicle body 12 and the suspension member 13. The suspension assembly 15 has a hydraulic cylinder 15A which serves as an actuator, and a coil spring 16. In the illustrated embodiment, the suspension coil spring 16 is not necessary to damp the bounding and rebounding kinematic energy and is required only to resiliently support the vehicle body on the road wheel resisting the static load due to the mass weight of the vehicle body. On the further positive side, the suspension coil spring 16 should be weak enough not to produce a damping force against vibrations to be transmitted between the vehicle body and the suspension member.

The hydraulic cylinder 15A has a hollow cylinder housing 15a filled with a viscous working fluid and a piston 15c sealingly and thrustingly disposed within the internal space of the cylinder housing to divide the cylinder space into upper and lower fluid chambers 15d and 15e. A piston rod 15b extends through one end of the cylinder housing 15a. The other end of the cylinder housing 15a is connected to one section of the vehicle body 12. The lower end of the piston rod 15b is connected to the suspension member 13. Therefore, the piston 15c is thrustingly movable in bounding and rebounding directions relative to the cylinder housing 15a according to relative displacement between the vehicle body and the suspension member.

The hydraulic cylinder 15A of the suspension assembly 15 is connected to a hydraulic pressure source unit 20 via a hydraulic circuit which includes pressure control valve 18. The pressure control valve 18 employed in the shown embodiment is provided with an actuator electrically operable according to a suspension control signal and connected to a control unit 30 to receive the suspension control signal therefrom. The hydraulic circuit includes a supply line 19s and a drain line 19d. High pressure accumulators 23H are connected to the supply line 19s and low pressure accumulators 22L are connected between the pressure control valves 18 and the associated hydraulic cylinder 15A. The pressure source comprises a pressure unit 20 and a reservoir tank 21. The pressure unit 20 is connected to the reservoir tank 21 to suck the viscous working fluid in the reservoir tank 21 to feed to the pressure control valve 18 via the supply line 19s. On the other hand, the drain line 19d is connected to the reservoir 21 to return the working fluid thereto.

As seen from FIG. 1, the low pressure accumulators 22L are connected to a branch pressure line 22B connected to the communication path 27 between the pressure control valves 18 and the upper fluid chambers 15d of the hydraulic cylinder 15A. A throttle valve 22V is inserted between the junction of the branch pressure line 22B and the communication path 27 and the low pressure accumulators 22L. The throttle valve 22V has a fixed throttling rate to provide a predetermined flow resistance against the working fluid flow therethrough.

The controller 30 is connected to a lateral acceleration sensor 29. The lateral acceleration sensor 29 outputs a lateral acceleration indicating signal α. The controller 30 derives the suspension control signals for controlling respective pressure control valves 18 based on the lateral acceleration indicating signal α.

Figure 2:
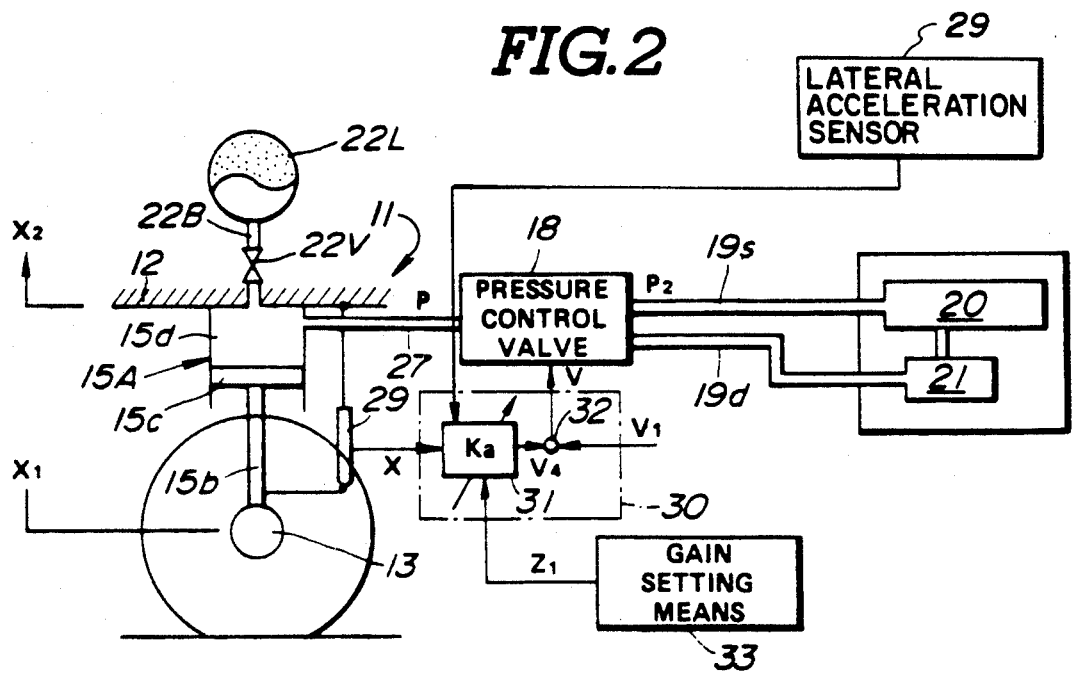
FIG. 2 is a section of one example of a hydraulic cylinder in combination with a hydraulic pressure control valve associated with the shock absorber for adjusting stiffness of the latter.
Figure 5:
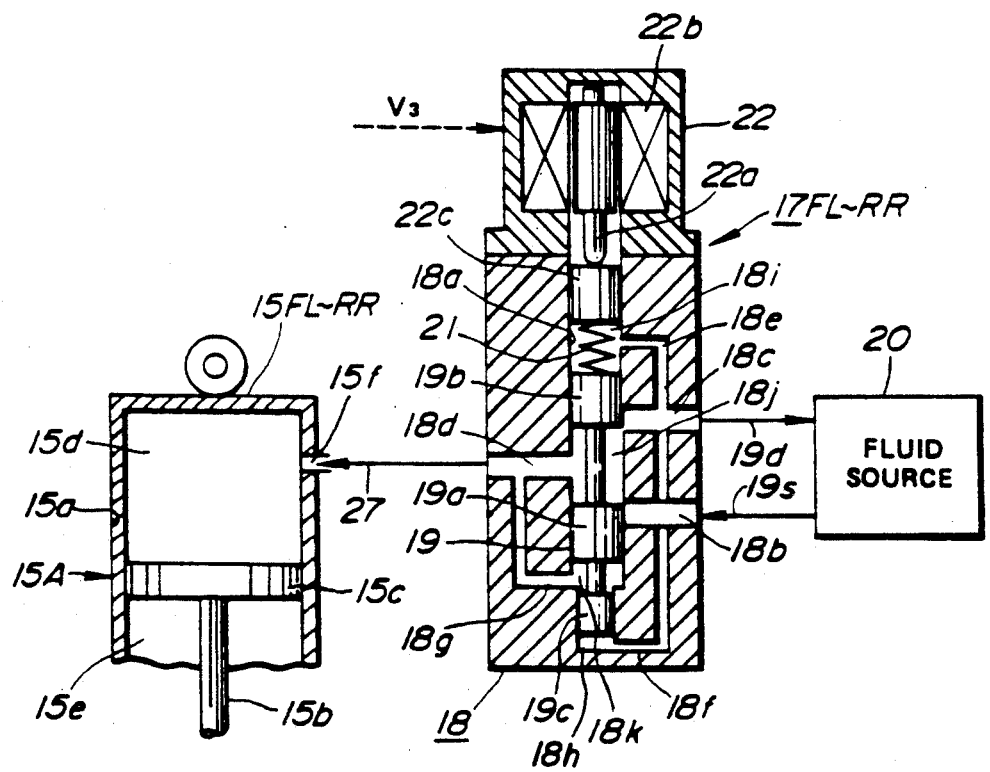
FIG. 5 is a diagrammatic illustration of the preferred embodiment of one of the active suspension systems employed in the preferred embodiment of the actively controlled suspension system according to the invention.

FIGS. 2 and 5 show the detailed construction of the hydraulic cylinder 15A and the pressure control valve 18. As will be seen from FIG. 2, the hollow cylinder housing 15a is formed with a port 15f communicating the upper fluid chamber 15d to an outlet port 18d of the pressure control valve 18 via a communication line 27. The pressure control valve 18 has a valve housing 18A having the aforementioned outlet port 18d, an inlet port 18b and a drain port 18c. Respective inlet port 18b, the drain port 18c and the outlet port 18d are connected to a valve bore 18a defined within the valve housing 18A. A valve spool 19 is disposed within the valve bore 18a for thrusting movement therein. The valve spool 19 has first, second and third lands 19a, 19b and 19c. As will be seen from FIG. 2, the third land 19c has smaller diameter than that of the first and second lands 19a and 19b. The third land 19c defines a fifth pressure control chamber 18h which is connected to the drain port 18c via a drain path 18f. An actuator piston 22c is also disposed within the valve bore 18a. The actuator piston 22c opposes the second land 19b in spaced apart relationship to define a second pressure control chamber 18i which is connected to the drain port 18c via a drain path 18e. An annular pressure chamber 18j is defined between the first and second lands 19a and 19b. The pressure chamber 18j is constantly communicating with the outlet port 18d and thereby communicating with the upper fluid chamber 15d. On the other hand, the pressure chamber 18j shifts according to shifting of the valve spool 19 to selectively communicate with the inlet port 18b and the drain port 18c. A pressure control chamber 18k is defined between the first and third lands 19a and 19c. The pressure control chamber 18k is in communication with the outlet port 18d via a pilot path 18g. A bias spring 22d is interposed between the actuator piston 22c and the valve spool 19. The spring force of the bias spring 22d balances with the hydraulic pressure in the pressure control chamber 18k to determine the valve spool position. The actuator piston 22c contacts an actuator rod 22a of an electrically operable actuator 22 which comprises an electromagnetic solenoid. The solenoid 22 is a proportioning solenoid which varies the magnitude of actuation of the actuator rod 22a to determine the valve spool position.

Figure 3:
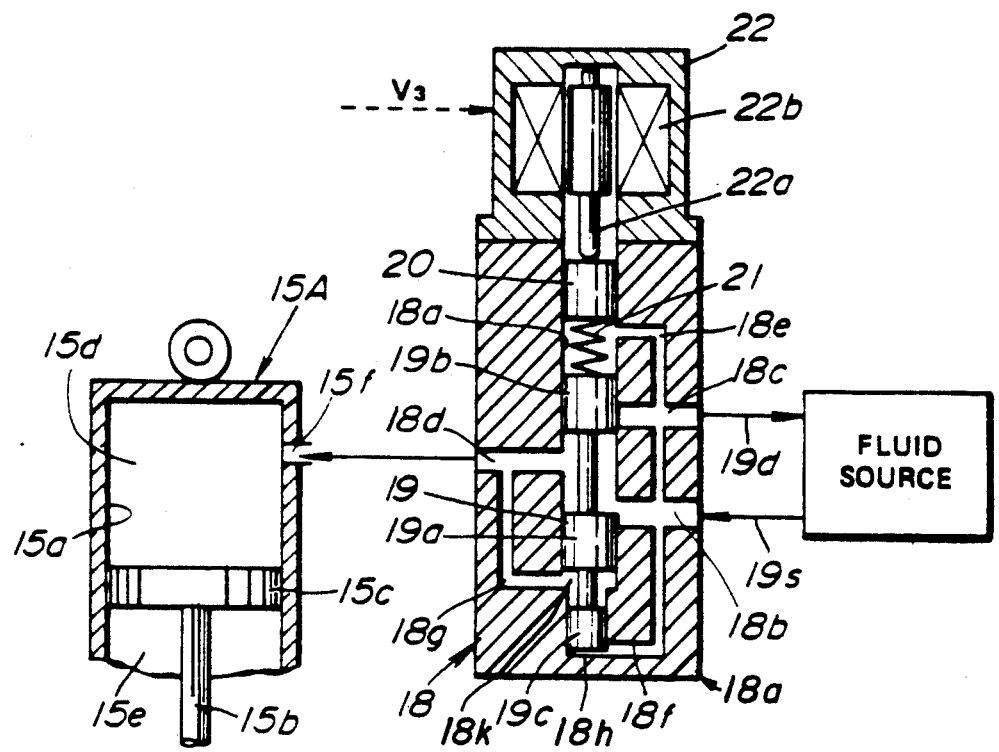
Figure 3:
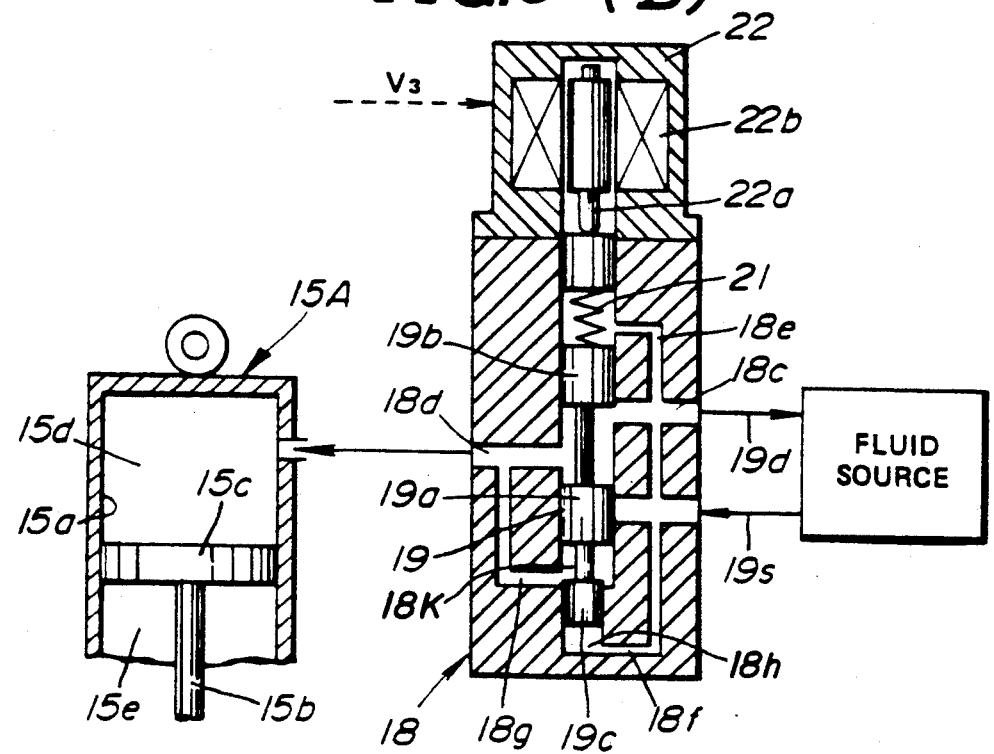

In order to increase the supply pressure of the working fluid, the spool valve 19 is shifted to the position shown in FIG. 3(A) to increase path area at a throttle at the inner end of the inlet port 18b by means of the land 19a of the spool valve 19. On the other hand, in order to decrease the supply pressure of the working fluid, the spool valve is shifted to the position shown in FIG. 3(B) to decrease the path area at the throttle of the inner end of the inlet port 18b and opens the drain port 18 which is normally blocked by means of the land 19b of the spool valve.

Construction of the pressure control valves should not be restricted to the construction as illustrated in FIGS. 2, 3(A) and 3(B) but can be replaced with any appropriate constructions. For example, the pressure control valve constructions as illustrated in European Patent First Publication 01 93 124, set forth above, can also be employed. The disclosure of the aforementioned European Patent First Publication 01 93 124 is herein incorporated by reference for the sake of disclosure.

Figure 4:
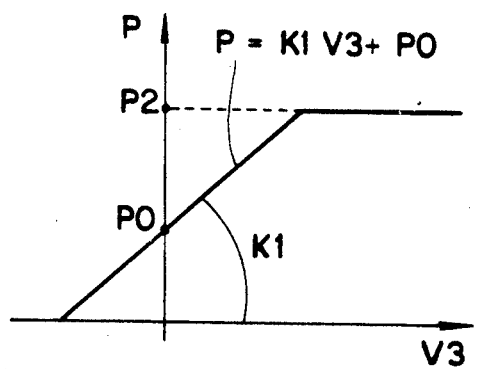
FIG. 4 is a graph showing variation of a hydraulic pressure to be supplied to a pressure control valve according to variation of drive signal voltage.

As seen from FIG. 2, the proportioning solenoid 22 comprises the actuator rod 22a and a solenoid coil 22b. The solenoid coil 22b is energized by suspension control signal $V_3$ from the controller 30. The magnitude of energization is variable depending upon the signal level of the suspension control signal. Therefore, the proportioning solenoid 22 shifts the actuator rod in a magnitude proportional to the suspension control signal level. In the illustrated embodiment of the pressure control valve, the working fluid pressure P at the outlet port 18d is variable according to the characteristics shown in FIG. 4. Namely, when the suspension control signal $V_3$ is zero, the pressure P at the outlet port 18 becomes $P_0$ determined according to a predetermined offset pressure $P_0$. When the suspension control signal value increases, the fluid pressure P at the outlet port 18d increases with a predetermined proportioning gain $K_1$. Namely, by increasing of the suspension control valve $V_3$, the actuator rod 22a is driven downwardly in FIG. 2 to the position of FIG. 3(A) to achieve increasing of the fluid pressure with the predetermined proportioning gain $K_1$. The fluid pressure P at the outlet port 18d is at the output pressure $P_2$ of the pressure unit 20. On the other hand, when the suspension control signal value $V_3$ decreases, the pressure P decreases to zero by shifting of the actuator rod 22a toward the direction shown in FIG. 3(B).

The actuator rod 22a of the proportioning solenoid 22 is associated with the actuator with the actuator piston 22c. Contact between the actuation rod 22a and the actuator piston 22c can be maintained by the resilient force of the bias spring 22d which normally biases the actuator piston toward the actuation rod. On the other hand, the spring force of the bias spring 22d is also exerted on the valve spool 19 to constantly bias the valve spool downwardly in FIG. 2. The valve spool 19 also receives upward hydraulic force from the pressure control chamber 18k. Therefore, the valve spool 19 is oriented at the position in the valve bore at the position where the downward bias of the bias spring 22d balances with the upward hydraulic force of the pressure control chamber 18k.

Here, the communication path 27, the outlet port 18d, the fluid chamber 15d of the hydraulic cylinder 15A and the pressure control valve 18 constitute the first hydraulic system. On the other hand, the low pressure accumulator 22L, the branch line 22B and the throttle valve 22V constitute the second hydraulic system with the fluid chamber 15d of the hydraulic cylinder 15A. The length and diameter of the pipe forming the communication path 27 is so selected as to generate a resistance against the working fluid flow therethrough. The flow resistance varies according to the input vibration frequency which corresponds to the stroke speed of the piston 15c of the hydraulic cylinder 15A in a non-linear fashion. More practically, the variation characteristics of the flow resistance in the communication path 27 is parabolic in relation to the vibration frequency. Furthermore, the flow resistance of the communication path is set smaller than the flow resistance in the second hydraulic system set forth above, when the input vibration frequency is lower than a broader frequency, e.g. 7 to 8 HZ), between the resonance frequency of the vehicle body and the resonance frequency of the suspension member as coupled with the road wheel. On the other hand, the flow resistance value of the communication path is set greater than or equal to the flow resistance in the second hydraulic system set forth above, when the input vibration frequency is higher than or equal to the broader frequency.

Figure 6:
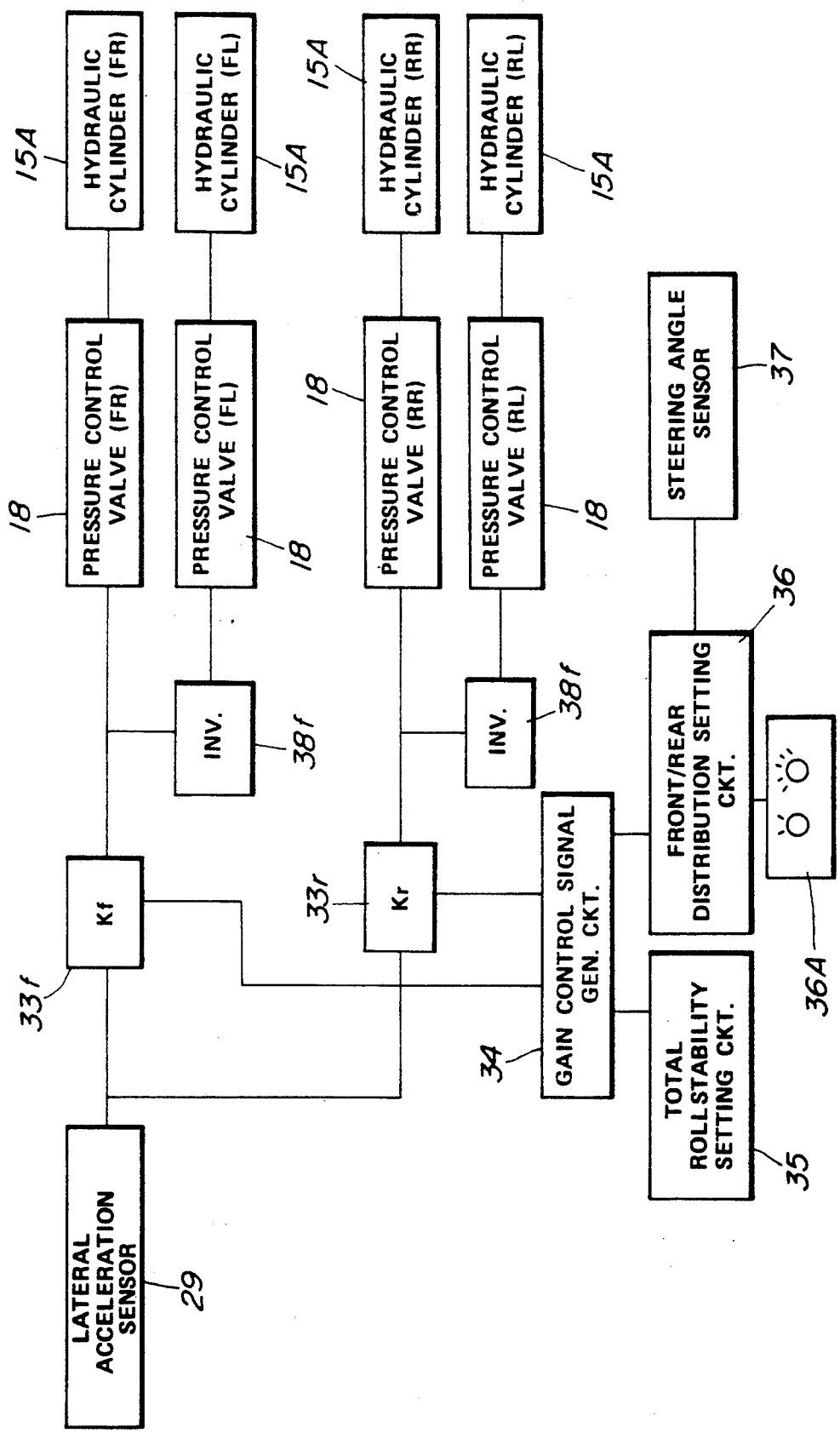
FIG. 6 is a block diagram of the preferred embodiment of a control circuit in the active suspension control system according to the invention, which control circuit adjusts rolling-stability of the suspension system.

On the other hand, FIG. 6 shows the preferred embodiment of the control circuit for controlling the actively controlled suspension system of FIG. 1.

As seen from FIG. 6, the controller 30 includes control signal generator circuits 33f and 33r, and inverter circuits 38f and 38r. As will be seen from FIG. 6, the control signal generator circuit 33f is designed for outputting a control signal for controlling the pressure control valves 18 in the front-left and front-right suspension systems 11FL and 11FR, which is, therefore, referred to as the 'front suspension control signal generator circuit'. Similarly, the control signal generator circuit 33r is designed for outputting the control signal for controlling the pressure control valves 18 in the rear-left and rear-right suspension systems 11RL and 11RR, which will be hereafter referred to as 'rear suspension control signal'.

The control signal generator circuits 33f and 33r comprise gain-controlled amplifiers respectively having variable gains Kf and Kr. On the other hand, the control signal generator circuits 31f and 31r are connected to a roll-stability distribution derivation circuit 34. The gain control signal generator circuit 34 is, in turn, connected to a total roll-stability setting circuit 35, and a front/rear distribution setting circuit 36. The front/rear distribution setting circuit 36 is connected to a steering angle sensor 37 and a manual selector unit 36A which includes a mode selector switch 36a and a manual set switch 36b. In the preferred construction, the total roll-stability setting circuit 35 includes a manual selector switch provided adjacent the driver's seat in the vehicle cabin so that the driver may be able to reach for setting the desired overall stiffness of the suspension systems and thereby setting the total roll-stability. The total roll-stability setting circuit 35 outputs a set total roll-stability indicating signal $Z_0$ to the gain control signal generator circuit 34.

On the other hand, the front/rear distribution setting circuit 36 receives a mode selector signal form the manual selector unit 36A. In practice, the mode selector switch 36a of the manual selector unit 36A is operable for manually selecting one of an AUTO mode and MANUAL mode. The manual set switch is operable when the mode selector switch 36a is set at the MANUAL mode position for setting front/rear distribution of the roll-stability. In the AUTO mode as selected by means of the mode selector switch 36a, the front-rear distribution setting circuit 36 is active to automatically adjust the front/rear distribution of the roll-stability in accordance with a predetermined front/rear distribution adjusting parameter. In the shown embodiment, the steering angle is taken as the front/rear distribution adjusting parameter. Therefore, the front/rear distribution setting circuit 36 is connected to the steering angle sensor 37 to receive therefrom a steering angle sensor. The steering angle sensor 37 may have per se well known construction and may comprise a photoelectric sensor, a potentiometer and so forth.

It should be appreciated that though the steering angle sensor 37 is employed in the illustrated embodiment as a sensor for detecting vehicular rolling condition and as the front/rear distribution adjusting parameter detecting means, it would be possible to employ other sensors which can satisfactorily detect vehicular rolling condition, such as a lateral acceleration sensor, a lateral force sensor and so forth. Furthermore, the manual selector unit 36A may be provided adjacent the drives's seat so that the driver may easily reach the same.

The front/rear distribution setting circuit 36 derives front/rear distribution based on the inputs from the manual selector unit 36A and the steering angle sensor 37. The front/rear distribution setting circuit 36 outputs a front/rear distribution indicating signal $\alpha$ to the gain control signal generator circuit 34.

The gain control signal generator circuit 34 is responsive to the total roll-stability indicating signal $Z_0$ and the front/rear distribution indicating signal $\alpha$ to derive gain control signals Zf and Zr. The gain control signal Zf to be transmitted to the front suspension control signal generator circuit 33f for determining the amplifier gain Kf, which gain control signal for adjusting the amplifier gain Kf in the front suspension control signal generator circuit will be hereafter referred to as the 'front gain control signal'. On the other hand, the gain control signal Zr is transmitted to the rear suspension control signal generator circuit 33r for determining the amplifier gain Kr, which gain control signal will be hereafter referred to as the 'rear gain control signal'. In practical operation, the front/rear distribution setting circuit 36 processes the manually set value indicating signal from the manual set switch 36b in the manual selector unit 36A as the mode selector switch 36a is set in the MANUAL mode position, the mode selector signal from the mode selector switch and the steering angle signal from the steering angle sensor 37. When the MANUAL mode is selected through the mode selector switch 36a, the manually set value as represented by the manually set value indicating signal is output from the front/rear distribution setting circuit 36 as the front/rear distribution indicating signal $\alpha$. On the other hand, when the AUTO mode is selected, the front/rear distribution setting circuit 36 derives the front/rear distribution value $\alpha$ according to the vehicular steering condition, automatically. In practice, the front/rear distribution setting circuit 36 sets the front/rear distribution value $\alpha$ at a predetermined initial value which is greater than or equal to 0.5, while the vehicle travels straight. On the other hand, the front/rear distribution setting circuit 36 is responsive to initiation of the vehicular steering operation which is detected by monitoring a change of the steering angle signal, to set the front/rear distribution value $\alpha$ at a value in the range of 0 to 0.5. The front/rear distribution setting circuit 36 is also responsive to termination of the vehicular steering operating which is detected by monitoring a change of the steering angle signal, to set the front/rear distribution value $\alpha$ at a value in the range of 0 to 0.5. The relationship of the front and rear gain control signal values Zf and Zr with respect to the front/rear distribution indicating value $\alpha$ may be seen from FIG. 6.

The gain control signal generator circuit 34 receives the total roll-stability indicating signal $Z_0$ from the total roll-stability setting circuit 35 and the front/rear distribution indicating signal $\alpha$ from the front/rear distribution setting circuit 36. The gain control signal generator circuit 34 processes the inputs, i.e. $Z_0$ and $\alpha$ to derive the front gain control signal Zf and the rear gain control signal Zr according to the following equations:

$$Zf = \alpha \times Z_0 \qquad (1)$$

$$Zr = Z_0 - Zf \qquad (2)$$

The front suspension control signal generator circuit 33f receives the lateral acceleration indicating signal $\alpha$ from the lateral acceleration sensor 29. The front suspension control signal generator circuit 33f also receives the front gain control signal Zf from the gain control signal generator circuit 34. The front suspension control signal generator circuit 33f determines the amplifier gain Kf according to the front gain control signal value Zf and amplifies the lateral acceleration indicating signal value $\alpha$ the determined gain Kf in order to derive the front suspension control signal Cf. The front suspension control signal Cf is fed to the proportioning solenoid 22 of the pressure control valve 18 in the front-right suspension system 11FR. The front suspension control signal Cf is also fed to the proportioning solenoid 22 of the pressure control valve in the front-left suspension system 11FL via the inverter circuit 38f. Therefore, the different polarity of the front suspension control signals Cf are input to the solenoids 22 of the pressure control valves 18 in the front-right and front-left suspension systems 11FR and 11FL.

The rear suspension control signal generator circuit 33r receives the lateral acceleration indicating signal $\alpha$ from the lateral acceleration sensor 29. The rear suspension control signal generator circuit 33r also receives the rear gain control signal Zr from the gain control signal generator circuit 34. The rear suspension control signal generator circuit 33r determines the amplifier gain Kr according to the rear gain control signal value Zr and amplifies the lateral acceleration indicating signal $\alpha$ with the determined gain Kr in order to derive the rear suspension control signal Cr. The rear suspension control signal Cr is fed to the proportioning solenoid 22 of the pressure control valve 18 in the rear-right suspension system 11RR. The rear suspension control signal Cr is also fed to the proportioning solenoid 22 of the pressure control valve in the rear-left suspension system 11RL via the inverter circuit 38f. Therefore, the different polarity of the rear suspension control signals Cr are input to the solenoids 22 of the pressure control valves 18 in the rear-right and rear-left suspension systems 11RR and 11RL.

Assuming the load distribution at respective road wheels 14FL, 14FR, 14RL and 14RR are even, characteristics of respective hydraulic cylinders 15A, of the loop-gains of the hydraulic pressure control circuits and of coil springs are same, distribution of the rolling stability at the front and rear suspension systems can be controlled by adjusting the fluid pressures in the hydraulic cylinders according to the front and rear suspension control signals Cf and Cr. By controlling the roll-stability distribution at the front and rear suspension systems, vehicular steering characteristics can be adjusted.

Namely, when the front suspension control signal Cf has greater value than that of the rear suspension control signal Cr, the roll-stabilization load at the front suspension systems 11FL and 11FR becomes greater than that of the rear suspension systems 11RL and 11RR. This causes reducing the relative cornering force as a total cornering force of the front-left and front-right suspension systems 11FL and 11FR at the front suspension systems to be smaller than that in the rear suspension systems. This increases cornering factor Ks to increase understeering characteristics of the vehicle. On the other hand, when the rear suspension control signal Cr has greater value than that of the front suspension control signal Cf, the roll-stabilization load at the rear suspension systems 11RL and 11RR becomes greater than that of the front suspension systems 11FL and 11FR. This causes reducing the relative cornering force as a total cornering force of the rear-left and rear-right suspension systems 11RL and 11RR at the rear suspension systems to be smaller than that in the front suspension systems. This decreases cornering factor Ks to increase oversteering characteristics of the vehicle.

Operation of the preferred embodiment of the actively controlled suspension system according to the invention will be described here below.

At first, it will be appreciated when the front suspension control signal value Cf is substantially same as rear suspension control signal value Cr, the roll-stabilization load distribution at front and rear suspension systems becomes even to provide substantially neutral steering characteristics.

As will be appreciated, in general, the resonance frequency of the suspension member with the road wheel is higher than the resonance frequency of the vehicle body. Therefore, when the vibration is input from the suspension member, the vibration frequency is usually higher than the broader frequency. On the other hand, when the vehicle body causes rolling, pitching, bouncing or so forth to input vibration, the vibration frequency is lower than the broader frequency. Since the flow resistance of the communication path 27 becomes greater than that of the second hydraulic system when the vibration is input from the suspension member. Therefore, in this case, the second hydraulic system becomes active to absorb vibration energy. On the other hand, when the vibration frequency is lower than the broader frequency during vehicular attitude change, such as vehicular rolling, pitching and bouncing and so forth, the first hydraulic system is active to adjust the fluid pressure in the fluid chamber 15d to suppress attitude change of the vehicle body.

For example, when bounding motion occurs at the suspension member, the piston 15c of the hydraulic cylinder 15A shifts upwardly to cause increasing of the fluid pressure in the upper chamber 15d. Since the input vibration frequency is higher than the broader frequency, the increased pressure is introduced into the low pressure accumulator 22L through the throttle valve 22V because that the second hydraulic circuit has lower flow resistance than that of the first hydraulic circuit. In this case, the throttle valve generates damping force against the piston stroke to successfully prevent the vibration energy input from the suspension member from being transmitted to the vehicle body.

Therefore, in response to the bounding motion of the suspension member causing increasing of the fluid pressure in the fluid chamber 15d, the pressurized fluid flows from the fluid chamber 15d to the low pressure accumulator 22L via the branch line 22B and the throttle valve 22V. Since the throttle valve 22V has a given throttling rate to limit fluid flow therethrough, this flow resistance serves as damping force for absorbing vibration energy so that the vibration energy is not transmitted to the vehicle body.

While the vehicle travels steadily as set forth above and assuming the AUTO mode is selected through the mode selector switch 36a of the manual selector unit 36A, the stroke indicating signals from respective stroke sensors 29FL, 29FR, 29RL and 29RR are substantially the same. Therefore, the outputs of the subtractor circuits 31 and 32 are held substantially zero. As a result, the front and rear suspension control signals Cf and Cr become substantially zero. Therefore, the solenoid coils 22a of the proportioning solenoids 22 of the pressure control valves 18 are held deenergized to maintain the fluid pressure in the fluid chambers 15d of respective hydraulic cylinders 15A at the initial offset pressure $P_0$. At this condition, the aforementioned first hydraulic systems in respective suspension systems are active for absorbing the road shock and other relatively high frequency vibrations.

In the alternative, it would be possible to avoid the first hydraulic system and absorb the road shock and so forth by the action of the valve spool 19 in response to pressure variation in the pressure control valve 18K. Namely in this case, when bounding motion occurs at the suspension member, the piston 15c of the hydraulic cylinder 15A shifts upwardly to cause increasing of the fluid pressure in the upper chamber 15d. This causes increasing of the fluid pressure at the outlet port 18d of the pressure control valve 18. As a result, the fluid pressure in the pressure control chamber 18k increases by the pressure introduced through the pilot path 18g to destroy the balance between the downward bias of the bias spring 22d and the upward hydraulic force of the pressure control chamber 18k. This causes upward movement of the valve spool 19 against the spring force of the bias spring 22d, as shown in FIG. 3(B). As a result, path area of the drain port 18c increases and the inlet port 18b becomes being blocked. Therefore, the fluid pressure in the fluid chamber 15d is drained through the drain port. Therefore, the increased fluid pressure in the fluid chamber 15d of the hydraulic cylinder 15A can be successfully absorbed so that the bounding energy input from the suspension member will not be transmitted to the vehicle body. On the other hand, when rebounding motion occurs at the suspension member, the piston 15c of the hydraulic cylinder 15A shifts downwardly to cause decreasing of the fluid pressure in the upper chamber 15d. This causes decreasing of the fluid pressure at the outlet port 18d of the pressure control valve 18. As a result, the fluid pressure in the pressure control chamber 18k decreases by the pressure introduced through the pilot path 18g to destroy the balance between the downward bias of the bias spring 22d and the upward hydraulic force of the pressure control chamber 18k. This causes downward movement of the valve spool 19 against the spring force of the bias spring 22d, as shown in FIG. 3(A). As a result, path area of the inlet port 18b increases and the drain port 18c becomes being blocked. Therefore, the fluid pressure in the fluid chamber 15d is increased by the pressure introduced through the inlet port. Therefore, the decreased fluid pressure in the fluid chamber 15d of the hydraulic cylinder 15A can be successfully absorbed so that the rebounding energy input from the suspension member will not be transmitted to the vehicle body.

Figure 7:
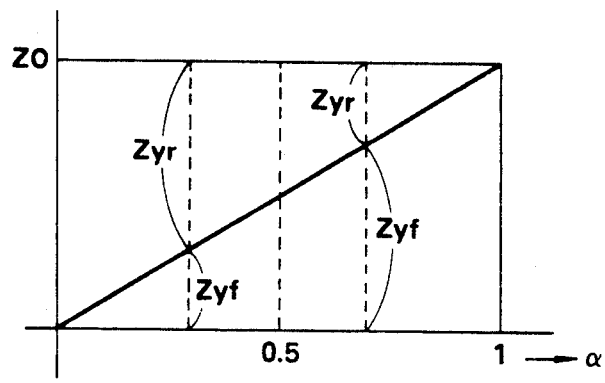
FIG. 7 is a chart showing distribution of the roll-stabilizing hydraulic pressure to be built-up in the front and rear suspension systems.
Figure 8:
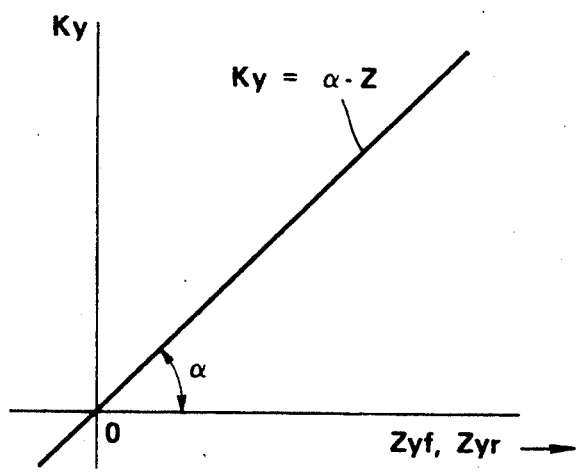
FIG. 8 is a graph showing variation of gain control signal value with respect to a manually set value.

If steering operation is performed for making left-hand turn, the vehicle body rolls to lower the left side and to lift-up the right side due to lateral force exerted on the vehicle body because of the presence of the centrifugal force so that the vehicle body inclines toward left with an angle $\theta$ with respect to the vertical plane, as shown in FIGS. 5, 7 and 8. Therefore, the lateral acceleration sensor 29 outputs the lateral acceleration indicating signal $\alpha$. If the front suspension systems are concerned, the fluid pressures in the hydraulic cylinders 15A of the front-left and front-right suspension systems 11FL and 11FR are determined according to the following process.

Assuming the mass weight of the vehicle body is M, the effective area of the hydraulic cylinder 45A of the front-left and front-right suspension systems is A, and the fluid pressure variation gain in the pressure control valve 18 is $K_1$, the variation magnitude of the fluid pressure in the hydraulic cylinder in response to the front suspension control signal Cf may be illustrated by the following equation (3):

$$P - P_0 = K_1 \times Cf \tag{3}$$

Here, setting the $(P-P_0)$ as $\Delta P$, the foregoing equation can be rewritten as the following equation (4):

$$\Delta P = K_1 \times Cf \tag{4}$$

Since the hydraulic force to be generated in each cylinder is A (effective area) $\times \Delta P$, the rolling moment Mr can be illustrated by the following equation:

$$Mr = A \times \Delta P + K(x_2 - x_1) \tag{5}$$

where
$x_2$ is the vehicle body elevation;
$x_1$ is the suspension member elevation; and
K is a spring coefficient of the coil spring 16.

Since the front suspension control signal value Cf is derived by $(Kf \times \alpha)$, the foregoing equation (5) can be modified as:

$$Mr + K(x_2 - x_1) = K_1 \times Cf \times A \tag{6}$$

Assuming the magnitude $x_1$ of the displacement of the suspension member is zero, the magnitude $x_2$ of the displacement of the vehicle body can be illustrated in a form of vibration transmission coefficient by the following equation (7) with Laplace conversion:

$$x_2/Cf = (K_1 \times A)/(MS^2 + K) \tag{7}$$

Therefore, the vibration transmission coefficient $(x_2/\alpha)$ can be illustrated by the following equation (8):

$$x_2/\alpha = (K_1 \times A \times Kf)/(MS^2 + K) \tag{8}$$

Figure 9:
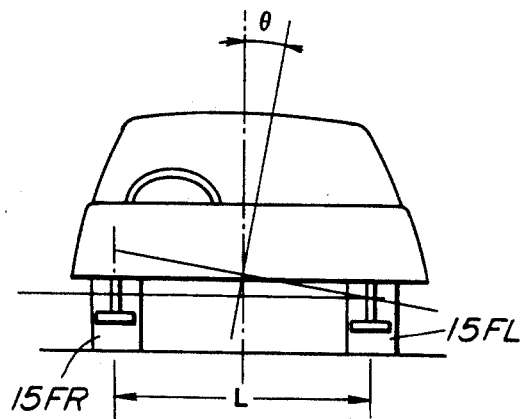
FIG. 9 is an explanatory illustration to be utilized for discussion of the roll-stabilizing operation of the preferred embodiment of the actively controlled suspension system.

On the other hand, FIG. 9 shows the vehicle to which anti-roll suspension control is not effected. In this case, the rolling motion of the vehicle body can be illustrated by the following equation (9):

$$J\ddot{\theta} + K \times (L^2/2) \times \theta = M \times H \times \alpha \tag{9}$$

where
J is a rolling inertia moment;
$\theta$ is rolling angle;
H is a distance between the gravity center and roll center;
K is a spring coefficient;
L is a tread distance.

The foregoing equation (9) can be modified as:

$$\theta/\alpha = (M \times H)/(JS^2 + KL^2/2) \tag{10}$$

Since $x_2$ is $(L\theta/2)$, the foregoing equation (10) can be further modified as:

$$X_2/\alpha = (L \times H \times M/2)/(JS^2 + KL^2/2) \tag{11}$$

As will be appreciated the foregoing equation (8) illustrates the response characteristics of the hydraulic system of the shown embodiment and the equation (11) illustrates the rolling motion of the vehicle body in response to the lateral acceleration. Therefore, as will be seen from the equations (8) and (11), the rolling motion of the vehicle body can be dynamically suppressed by setting the amplifier gain kf appropriately. This can be regarded as substantially equivalent to the roll-stabilizing force to be created by the conventional roll-stabilizers.

On the other hand, upon initiation of the steering operation, the front/rear distribution setting circuit 36 detects the fact based on variation of the steering angle signal from the steering angle sensor 37. As set forth, since the AUTO mode is selected, the front/rear distribution setting circuit 36 sets the front/rear distribution indicating value α within a range of 0 to 0.5 for a given period of time. Therefore, front gain control signal Zf to be fed to the front suspension control signal generator circuit 33f becomes smaller than the rear suspension control signal Zr which is to be fed to the rear suspension control signal generator circuit 33r. Therefore, the front amplifier gain Kf of the front suspension control signal generator circuit 33f becomes smaller than the rear amplifier gain Kr of the rear suspension control signal generator 33r. Assuming the rolling magnitude at front suspension systems 11FL and 11FR and the rear suspension systems 11RL and 11RR are the same, the fluid pressure variation ΔP in the front suspension systems becomes smaller than that of the rear suspension systems. This increases oversteering characteristics of the vehicle to provide better turning ability.

In the practical suspension control for the front suspension systems 11FL and 11FR, the front suspension control signals Cf which becomes the negative value, is fed to the proportioning solenoid 22 of the pressure control valve 18 in the front-left suspension system 11FL via the inverter 38f. Therefore, the proportioning solenoid 22 becomes active to operate the pressure control valve 18 in the front-left suspension system to increase the fluid pressure in the front-left suspension system to raise the left side of the vehicle body toward the neutral position. On the other hand, the negative value of front suspension control signals Cf negative value is directly fed to the proportioning solenoid 22 of the pressure control valve 18 in the front-right suspension system 11FR. Therefore, the proportioning solenoid 2 becomes active to operate the pressure control valve 18 in the front-right suspension system to decrease the fluid pressure in the front-right suspension system to lower the right side of the vehicle body toward the neutral position. Therefore, the vehicle rolling can be successfully suppressed.

Similarly, the rear suspension control signal Cr which is derived substantially in the same manner as that for the front suspension control signal and has greater absolute value than that of the front suspension control signal. The rear suspension control signals Cr which becomes the negative value, is fed to the proportioning solenoid 22 of the pressure control valve 18 in the rear-left suspension systems 11RL via the inverter 38r. Therefore, the proportioning solenoid 22 becomes active to operate the pressure control valve 18 in the rear-left suspension system to increase the fluid pressure in the rear-left suspension system to raise the left side of the vehicle body toward the neutral position. On the other hand, the negative value of rear suspension control signals Cr is directly fed to the proportioning solenoid 22 of the pressure control valve 18 in the rear-right suspension system 11RR. Therefore, the proportioning solenoid 22 becomes active to operate the pressure control valve 18 in the rear-right suspension system to decrease the fluid pressure in the rear-right suspension system to lower the right side of the vehicle body toward the neutral position. Therefore, the vehicle rolling can be successfully suppressed.

On the other hand, upon termination of the steering operation, the front/rear distribution setting circuit 36 detects the fact based on variation of the steering angle signal from the steering angle sensor 37. As set forth, since the AUTO mode is selected, the front/rear distribution setting circuit 36 sets the front/rear distribution indicating value α within a range of 0.5 to 1 for a given period to time. Therefore, the front gain control signal Zf to be fed to the front suspension control signal generator circuit 33f becomes greater than the rear suspension control signal Zr which is to be fed to the rear suspension control signal generator circuit 33r. Therefore, the front amplifier gain Kf of the front suspension control signal generator circuit 33f becomes greater than the rear amplifier gain Kr of the rear suspension control signal generator 33r. Assuming the rolling magnitude at front suspension systems 11FL and 11FR and the rear suspension systems 11RL and 11RR are the same, the fluid pressure variation Δ in the front suspension systems becomes smaller than that of the rear suspension systems. This increases understeering characteristics of the vehicle to provide better stability.

Therefore, according to the shown embodiment, the active suspension system according to the present invention, exhibits roll-stabilization ability equivalent to the conventional mechanical roll-stabilizer. In addition to this, the shown embodiment of the active suspension system can provide improved cornering characteristics with variation of the steering characteristics during cornering.

In addition, the shown embodiment is provided capability of manually setting the front/read distribution value in MANUAL mode, steering characteristics fitting the driver's taste can be selected.

Figure 11:
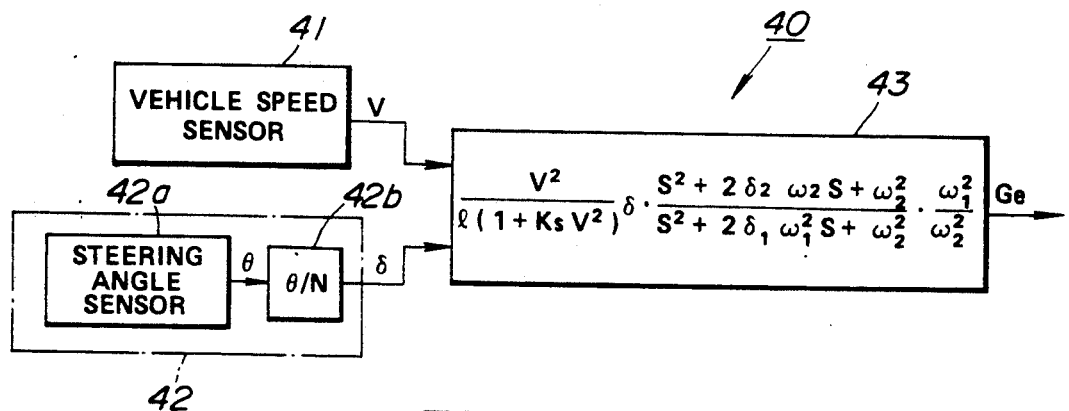
FIG. 11 is a block diagram of a lateral acceleration projecting means to be employed in the preferred embodiment of the actively controlled suspension system according to the invention.

FIG. 11 shows a modified embodiment of the actively controlled suspension system according to the invention. In this embodiment, the lateral acceleration sensor 29 is replaced with a lateral acceleration projecting means 40. This is intended to avoid influence of the lateral acceleration generated due to vehicular rolling to perform anti-rolling active suspension control purely depending on the lateral acceleration externally exerted on the vehicle body due to the centrifugal force generated by cornering. In addition, by utilizing the lateral acceleration projecting means 40, self-excited vibration which otherwise occurs in the lateral acceleration sensor when the sensitivity is increased, can be avoided.

In the shown embodiment, the lateral acceleration projecting means 40 comprises a vehicle speed sensor 41, a steering condition detecting means 42 which includes a steering angle sensor 42a and an actual steering angle derivation circuit 42b, and an arithmetic circuit 43. The vehicle speed sensor 41 monitors the vehicle traveling speed to produce a vehicle speed indicating signal V. In practice, the vehicle speed sensor 41 is designed to monitor rotation speed of a power transmission output shaft. A transmission output shaft reference position indicating pulse is produced at every predetermined angular position of the transmission output shaft. The transmission output shaft reference position indicating pulse is counted to derive the vehicle speed value based on the counter value in the given unit time. The steering angle sensor 42a monitors steering angular displacement to produce a steering angle signal $\delta_0$. The steering angle sensor 42a is connected to the actual steering angle derivation circuit 42b to feed the steering angle signal $\delta_0$. The actual steering angle derivation circuit 42b derives the actual steering angle δ based on the steering angle signal value and a known steering gear ratio N. In practice, the actual steering angle δ can be derived from the following equation:

$$\delta = \delta_0 / N$$

Based on the above, the arithmetic circuit 43 performs calculation of the actual lateral acceleration G according to the following equation (12):

$$G = \frac{V^2}{l(1 + K_s V^2)} \delta \cdot \frac{S^2 + 2\zeta_2 \omega_2 S + \omega_2^2}{S^2 + 2\zeta_1 \omega_1 S + \omega_1^2} \cdot \frac{\omega_2^2}{w_1^2} \quad (12)$$

where $\zeta_1 = \frac{(C_1 + C_2)I + (l_1^2 C_1 + l_2^2 C_2)M}{\sqrt{2 l\, IMC_1 C_2 (1 + K_s V^2)}}$ $$\zeta_2 = \frac{b}{2V} \sqrt{\frac{lC_2}{I}}$$

$$\omega^1 = \frac{l}{V} \sqrt{\frac{C^1 C^2}{IM}} (1 + K_s V^2)$$

$$\omega^2 = \sqrt{\frac{lC^2}{I}}$$

$C_1$ is a cornering force at the front wheel;
$C_1$ is a cornering force at the rear wheel;
$l$ is wheel base length;
$l_1$ is a distance between the front wheels and a gravity center;
$l_2$ is a distance between the rear wheels and a gravity center;
M is a mass weight of the vehicle;
I is yawing moment to be exerted on the vehicle;
$K_s$ is a stability factor;
S is a Laplace conversion coefficient;
$\zeta_1$, $\zeta_2$ are damping ratios; and
$\omega_1$ and $\omega_2$ are natural frequencies.

Figure 12:
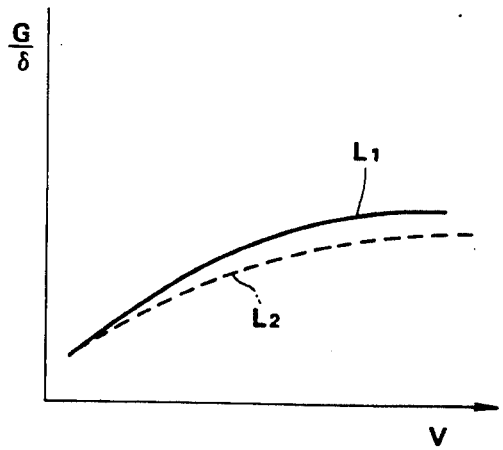
FIG. 12 is a graph showing the relationship between the ratio of projected lateral acceleration and actual steering angle, and the vehicle speed.
Figure 13:
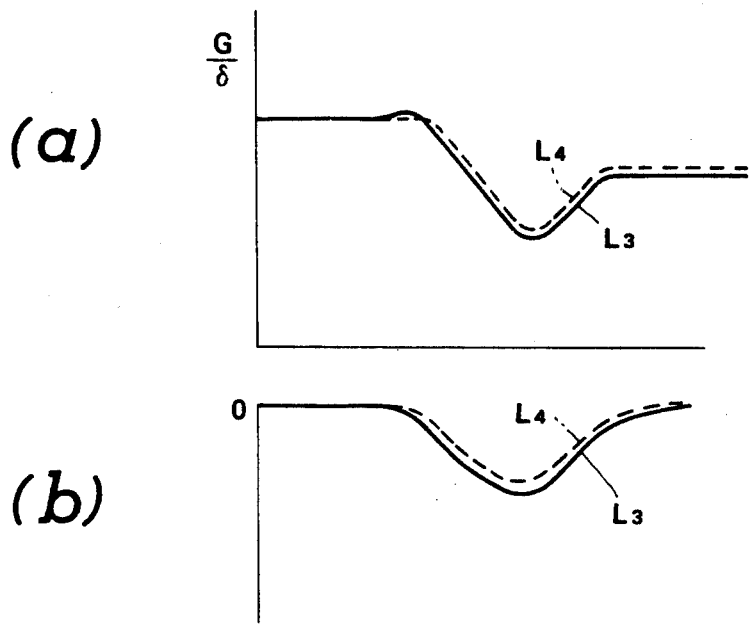
FIGS. 13(A) and 13(B) show response characteristics with respect to vibration frequency represented by the relationship between G/δ ratio and the vibration frequency.

According to the foregoing equation (12), the relationship between the logarithm of the $G/\delta$ and the vehicle V can be illustrated as shown by the solid line $L_1$ in FIG. 12. As will be seen herefrom, the variation characteristics of the solid line $L_1$ is equivalent to that of the broken line $L_2$ which shows actually measured lateral force on the vehicle. On the other hand, the relationship between the frequency of the bounding and rebounding motion and $G/\delta$ ratio and the relationship between the bounding and rebounding frequency and the phase are shown by lines $L_3$ in FIGS. 13(A) and 13(B). This becomes substantially equivalent to those obtained in measurement of actual lateral acceleration as illustrated by the broken lines $L_4$. Therefore, according to the shown embodiment of the lateral acceleration projecting circuit 40, a proper projected lateral acceleration value Ge can be obtained with incorporating the factor of responding ability to bounding and rebounding frequency.

Accordingly, by inputting the projected lateral acceleration value Ge to the control circuit 30 set forth above, substantially the same lateral acceleration dependent rolling suppressive or anti-rolling suspension control can be performed. In addition, since the steering angle sensor and the vehicle speed sensor are provided irrespective of the suspension control and the signals thereof can be used commonly to other vehicle equipment control, the cost for forming the suspension control can be lowered as that can neglect the lateral acceleration sensor. Furthermore, as set forth above, since the shown embodiment can avoid the influence of the lateral acceleration caused by vehicular rolling. Furthermore, since the lateral acceleration dependent anti-rolling suspension control can be performed with an OPEN LOOP control system without utilizing FEEDBACK control system, self-excited hunting in the control system can be successfully avoided.

Figure 14:
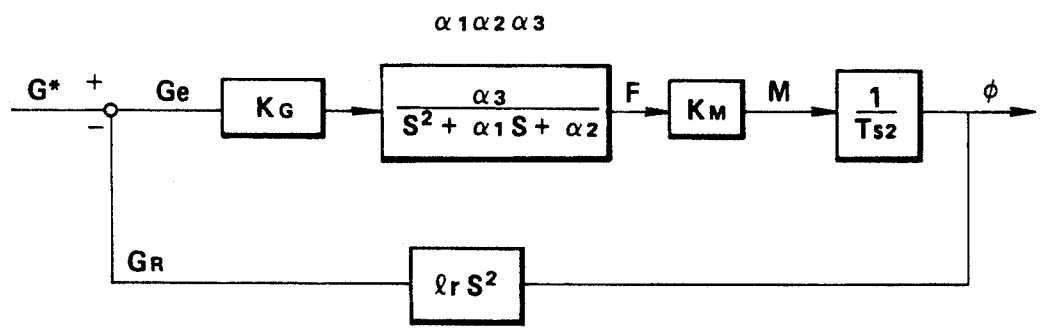
FIG. 14 is a block diagram of a lateral acceleration feedback system in the preferred embodiment of the actively controlled suspension system according to the invention.
Figure 15:
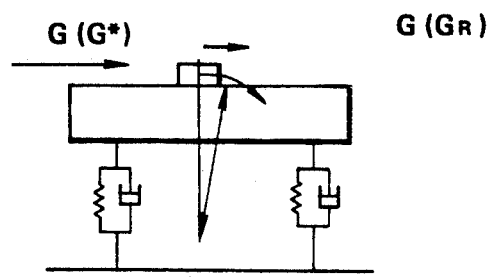
FIG. 15 is an explanatory illustration showing the operation of the feedback system of FIG. 14.

It will be appreciated that, when the lateral acceleration sensor is used for detecting lateral acceleration exerted on the vehicle, the lateral acceleration sensor will respond to the kinematic action of the portion of the vehicle body where the lateral acceleration sensor is provided. This action of the portion of the vehicle body is caused when the lateral acceleration is exerted and the vehicular rolling is indeed caused. Therefore, the control system is constituted as FEEDBACK control system as shown in FIG. 14. In such FEEDBACK control system, detecting of the lateral acceleration delays. In order to compensate delay in detecting the lateral acceleration, rise sensitivity of the FEEDBACK system becomes necessary. For increasing the sensitivity of the FEEDBACK control system, the sensitivity of the lateral acceleration sensor has to be increased. This will cause instability of the FEEDBACK control system due to hunting caused in the sensor.

In addition, due to delay of detection of the lateral acceleration, the factor of lateral acceleration generated by rolling action of the vehicle body is incorporated in the detected lateral acceleration.

According to the shown embodiment, since the lateral acceleration to be exerted on the vehicle body is projected in terms of the vehicle speed and the steering angular displacement, no FEEDBACK loop becomes necessary to successfully avoid hunting of the lateral acceleration. On the other hand, since the lateral acceleration can be projected before the vehicular rolling occurs actually, responsibility of the suspension control becomes substantially high.

Figure 10:
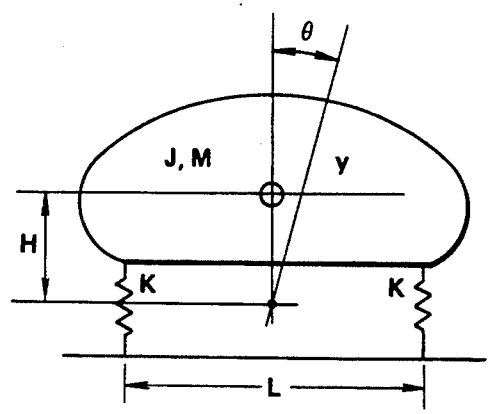
FIG. 10 is an illustration showing an equivalent model of the preferred embodiment of the actively controlled suspension system according to the invention.

On the other hand, in case of the aforementioned second embodiment, the projected lateral acceleration value becomes greater than that of the actual value when lateral slip occurs on the vehicle. This can be solved by additionally providing the lateral acceleration sensor to the control system employing the lateral acceleration projecting circuit 40 of FIG. 10. In order to detect lateral slip of the vehicle, the projected acceleration value Ge is compared with the measured acceleration value G output from the lateral acceleration sensor. An absolute value of Ge/G is checked to judge whether lateral slip occurs or not. When the absolute value is close to "1", judgement is made that lateral slip does not occur. In this case, the projected lateral acceleration value derived by the lateral acceleration projecting circuit 40 is used for suspension control. On the other hand, when the absolute value is substantially smaller than "1", judgement is made that lateral slip occurs. Then, damping rates $\zeta_1$ and $\zeta_2$ and natural frequencies $\omega_1$ and $\omega_2$ are corrected to derive the projected lateral acceleration with the corrected damping rates and natural frequencies.

Figure 16:
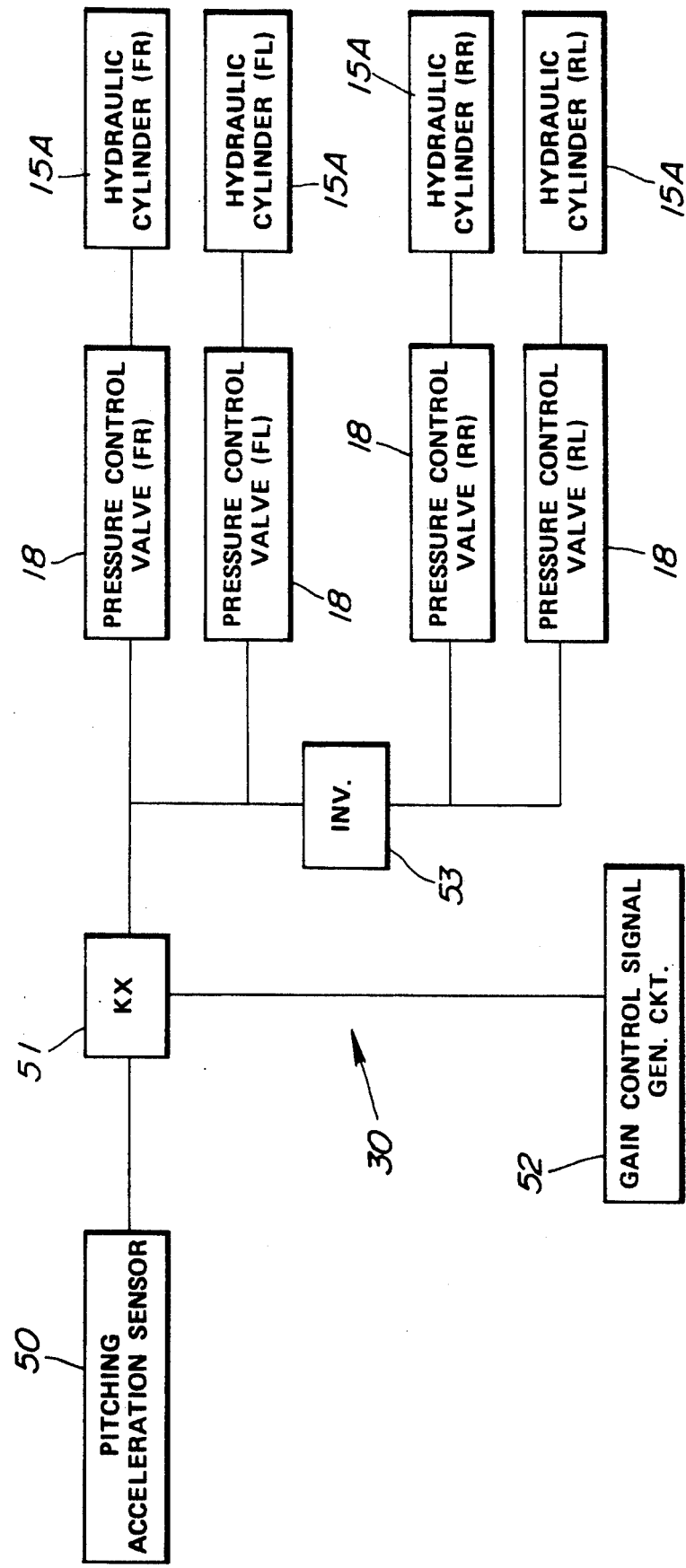
FIG. 16 is a block diagram of a modified embodiment of the actively controlled suspension system according to the invention.

FIG. 16 shows the third embodiment of the active suspension control system according to the present invention. In this embodiment, pitching suppressive active suspension control is performed utilizing a pitching acceleration sensor 50.

As seen from FIG. 16, the pitching acceleration sensor 50 is connected to a control circuit 30 which incorporates a pitching acceleration dependent suspension control signal generator circuit 51 and an inverter 52. The pitching acceleration sensor 51 is responsive to the vehicular pitching acceleration which causes lowering of the front and lifting up of the rear end, the pitching acceleration indicating signal value becomes positive. On the other hand, the pitching acceleration indicating signal value becomes negative when the pitching acceleration causes lowering of the rear end and lifting up at the front end. The pitching acceleration dependent suspension control signal generator circuit 51 is also connected to a gain value setting circuit 52 to receive therefrom a gain control signal. The pitching acceleration dependent suspension control signal generator circuit 51 amplifies a pitching acceleration indicating signal from the pitching acceleration sensor 50, with a given gain value Kx. The pitching acceleration dependent suspension control signal generator circuit 51 is connected to the solenoids 22 of the front-left and front-right pressure control valves 18. On the other hand, the pitching acceleration dependent suspension control signal generator circuit 51 is connected to the solenoids 22 of the rear-left and rear-right pressure control valves 18 via the inverter 53. Therefore, to the solenoids 22 of the rear-left and rear-right pressure control valves 18, a pitching acceleration dependent suspension control signal with opposite polarity to that applied to the solenoid valve 22 in the front-left and front-right pressure control valves 18 is applied.

When vehicular pitching occurs, the pitching acceleration indicating signal is produced by the pitching acceleration sensor 50. The pitching acceleration dependent suspension control signal generator 51 amplifies the input pitching acceleration indicating signal with a given gain value Kx which is determined according to the gain control signal from the gain value setting circuit 52 to output the amplified signal as the pitching suppressive suspension control signal. As set forth the polarity of the pitching suppressive control signal to be input to the rear-left and rear-right pressure control valves 18 are opposite to that for the front-left and front-right pressure control valves 18. Therefore, when one of the front and rear suspension systems act to suppress bounding motion at the corresponding portion of the vehicle, the other suspension systems act for suppressing rebounding motion of the corresponding portion of the vehicle body.

For example, if noise-dive occurs by braking operation, the front end position of the vehicle body is lowered and the rear end position is lifted up. In response to this, the positive value of the pitching acceleration indicating signal is input to the pitching acceleration dependent suspension control signal generator circuit 51. The pitching acceleration dependent suspension control signal generator circuit 51 amplifies the received pitching acceleration indicating signal with a given gain Kx to output the suspension control signal. Since the positive value of the pitching suppressive suspension control signal is input to the front-left and front-right pressure control valves 18, the fluid pressure in the hydraulic cylinders 15A of the front-left and front-right suspension systems is increased to suppress lowering of the front end. On the other hand, since the negative value of the pitching suppressive suspension control signal is input to the rear-left and rear-right pressure control valves 18, the fluid pressure in the hydraulic cylinders 15A of the rear-left and rear-right suspension systems is increased to suppress lifting up of the rear end.

As will be appreciated, by adding the roll-damping factor, rolling speed dependent roll-stabilization becomes possible. This will be advantageous to suppress rapid change of the vehicular attitude in vehicular rolling to increase roll-stability of the vehicle.

Though the embodiments have been disclosed for suppressing the attitude change of the vehicle body by adjusting the vehicle height, it should be possible to adjust only damping characteristics in response to the bounding and rebounding strokes of the hydraulic cylinder. Furthermore, though the stroke sensor comprises the potentiometer in the illustrated embodiment, any appropriate sensors, such as a differential transducer, ultrasonic distance sensor and so forth, may be applicable. In addition, the hydraulic cylinder may be replaced with any appropriate suspension element, such as pneumatic cylinder, hydropneumatic cylinder and so forth.

What is claimed is:

1. An actively controlled suspension system for an automotive vehicle comprising:

first pressure means disposed between a first lateral side of a vehicle body and a first suspension member supporting first front and rear road wheels, said first pressure means including a variable pressure chamber varying pressure of a working fluid therein for adjusting relative displacement between the vehicle body and the first suspension member;

second pressure means disposed between a second lateral side of the vehicle body opposite the first lateral side and a second suspension member supporting second front and rear wheels, said second pressure means including a variable pressure chamber varying pressure of a working fluid therein for adjusting relative displacement between the vehicle body and the second suspension member;

lateral acceleration determining means including a vehicle speed sensor which monitors vehicle speed V to provide a signal indicative thereof and a steering angle sensor which monitors a steered angle of a steering wheel to determine an actual steered angel $\delta$ of the road wheels and provides a signal indicative thereof, said lateral acceleration determining means projecting a lateral acceleration G, which causes rolling motion of the vehicle body, according to the following relation and providing a lateral acceleration indicative signal, $$G = \frac{V^2}{l(1 + K_s V^2)} \delta \cdot \frac{S^2 + 2\zeta_2 \omega_2 S + \omega_2^2}{S^2 + 2\zeta_1 \omega_1 S + \omega_1^2} \cdot \frac{\omega_2^2}{w_1^2}$$

wherein,
V is vehicle speed,
l is wheel base length,
$k_s$ is a stability factor,
S is a Laplace operator,
$\zeta_1, \zeta_2$ are damping ratios, and
$\omega_1, \omega_2$ are natural frequencies; and a controller responsive to the acceleration indicating signal from said lateral acceleration determining means to amplify it with a preselected gain to provide first and second control signals, each control signal having a preselected signal level which includes a polarity opposite that of the other control signal, said controller outputting the first and second control signals to said first and second pressure means to increase and decrease the pressure of the working fluid in the variable pressure chambers respectively for suppressing rolling motion of the vehicle body.

2. An actively controlled suspension system for an automotive vehicle comprising:

front pressure means including, a first actuator which is provided at a front portion of a first lateral side of a vehicle body, interposed between the vehicle body and a suspension member rotatably supporting an associated front road wheel, said first actuator having a first variable pressure chamber and, a second actuator provided at a front portion of a second lateral side of the vehicle body, interposed between the vehicle body and a suspension member rotatably supporting an associated front road wheel, said second actuator having a second variable pressure chamber;

rear pressure means including a third actuator which is provided at a rear portion of the first lateral side of the vehicle body, interposed between the vehicle body and a suspension member rotatably supporting an associated rear road wheel, said third actuator having a third variable pressure chamber and a fourth actuator provided at a rear portion of the second lateral side of the vehicle body, interposed between the vehicle body and a suspension member rotatably supporting an associated rear road wheel, the fourth actuator having a fourth variable pressure chamber;

a steering angle sensor which monitors angular acceleration of steering of a steering angle to determine initial and final stages of steering operation during cornering to provide a signal indicative thereof;

lateral acceleration determining means for determining lateral acceleration acting on the vehicle body to cause rolling motion of the vehicle body and providing a signal indicative thereof;

a control unit responsive to the signal from said lateral acceleration determining means to amplify said signal with first and second preselected gains to provide first and second control signals to said front and rear pressure means respectively to adjust pressure in the first, second, third, and fourth variable pressure chambers to suppress rolling motion; and a gain controller which changes a gain ratio from first to second preselected gains according to the signal from said steering angle sensor.

3. A system as set forth in claim 2, wherein the first and second control signals are output to the first and third actuators respectively to increase pressure in the first and third variable pressure chambers and inverted in signal level to provide control signals having polarities opposite the first and second control signals to the second and fourth actuators to decrease pressure in the second and fourth variable pressure chambers for suppressing the rolling motion.

4. A system as set forth in claim 3, wherein said gain controller provides the first gain smaller than the second gain at the initial stage of the steering operation and the first gain greater than the second gain at the final stage of the steering operation.

5. A system as set forth in claim 4, wherein said steering angle sensor further determines an intermediate stage of the steering operation to provide a signal indicative thereof, said gain controller being responsive to the signal from said steering angle sensor to provide first and second gains which are equal in ratio at the intermediate stage of the steering operation.

6. A system as set forth in claim 3, further comprising total gain setting means for setting a total gain of the first and second gains, said total gain setting means including a manual selector which manually selects a magnitude of the total gain.

7. A system as set forth in claim 3, wherein said lateral acceleration determining means includes a vehicle speed sensor which monitors vehicle speed to provide a signal indicative thereof and a steering angle sensor which monitors a steered angle of a steering wheel to project lateral acceleration, which causes rolling motion of the vehicle body, based thereon.

8. An actively controlled suspension system for an automotive vehicle comprising:

front pressure means including, a first actuator which is provided at a front portion of a first lateral side of a vehicle body, interposed between the vehicle body and a suspension member rotatably supporting an associated front road wheel, said first actuator having a first variable pressure chamber and, a second actuator which is provided at a front portion of a second lateral side of the vehicle body, interposed between the vehicle body and a suspension member rotatably supporting an associated front road wheel, said second actuator having a second variable pressure chamber:

rear pressure means including, a third actuator which is provided at a rear portion of the first lateral side of the vehicle body, interposed between the vehicle body and a suspension member rotatably supporting an associated rear road wheel, the third actuator having a third variable pressure chamber and, a fourth actuator provided at a rear portion of the second lateral side of the vehicle body, interposed between the vehicle body and a suspension member rotatably supporting an associated rear road wheel, the fourth actuator having a fourth variable pressure chamber;

lateral acceleration determining means for determining lateral acceleration, which acts on the vehicle body to cause rolling motion of the vehicle body, and providing a signal indicative thereof;

a control unit responsive to the signal from said lateral acceleration determining means to amplify said signal with first and second gains to provide first and second control signals to said front and rear pressure means respectively to adjust pressure in the first, second, third, and fourth variable pressure chambers to suppress rolling motion; and a gain selector which manually changes a gain ratio of the first to second preselected gains.

9. A system as set forth in claim 8, wherein the first and second control signals are output to the first and third actuators respectively to increase pressure in the first and third variable pressure chamber, said first and second control signals also being inverted in a signal level to provide control signals having polarities opposite the first and second control signals to the second and fourth actuators to decrease pressure in the second and fourth variable pressure chambers for suppressing rolling motion.

10. A system as set forth in claim 9, further comprising a total gain setting means for setting a total gain of the first and second gains, said total gain setting means including a manual selector which manually selects a magnitude of the total gain.

11. An actively controlled suspension system for an automotive vehicle comprising:

front pressure means including, a first actuator which is provided at a front portion of a first lateral side of a vehicle body, interposed between the vehicle body and a suspension member rotatably supporting an associated front road wheel, the first actuator having a first variable pressure chamber and, a second actuator which is provided at a front portion of a second lateral side of the vehicle body, interposed between the vehicle body and a suspension member rotatably supporting an associated front road wheel, the second actuator having a second variable pressure chamber;

rear pressure means including, a third actuator which is provided at a rear portion of the first lateral side of the vehicle body, interposed between the vehicle body and a suspension member rotatably supporting an associated rear road wheel, the third actuator having a third variable pressure chamber and, a fourth actuator provided at a rear portion of the second lateral side of the vehicle body, interposed between the vehicle body and a suspension member rotatably supporting an associated rear road wheel, the fourth actuator having a fourth variable pressure chamber;

lateral acceleration determining means for determining lateral acceleration, which acts on the vehicle body to cause rolling motion of the vehicle body, and providing a signal indicative thereof;

a control unit responsive to the signal from said lateral acceleration determining means to amplify said signal with first and second gains to provide first and second control signals to said front and rear pressure means respectively to adjust pressure in the first, second, third, and fourth variable pressure chambers to suppress rolling motion of the vehicle body; and a total gain setting means for setting a total gain of the first and second gains, said total gain setting means including a manual selector which manually selects a magnitude of the total gain.

12. A system as set forth in claim 11, wherein the first and second control signals are output to the first and third actuators respectively to increase pressure in the first and third variable pressure chambers, the first and second control signals also belong inverted in a signal level to provide control signals having polarities opposite the first and second control signals to the second and fourth actuators to decrease pressure in the second and fourth variable pressure chambers for suppressing rolling motion.

13. An actively controlled suspension system for an automotive vehicle comprising:

front pressure means disposed between a front portion of a vehicle body and a front suspension member supporting a front road wheel, said front pressure means including a variable pressure chamber varying pressure of a working fluid therein for adjusting relative displacement between the vehicle body and the front suspension member;

rear pressure means disposed between a rear portion of the vehicle body and a rear suspension member supporting a rear road wheel, said rear pressure means including a variable pressure chamber varying pressure of a working fluid therein for adjusting relative displacement between the vehicle body and the rear suspension member;

longitudinal acceleration determining means which determines longitudinal acceleration acting on the vehicle body to cause pitching motion of the vehicle body and providing a signal indicative thereof;

a controller responsive to the signal from said longitudinal acceleration determining means to amplify it with a preselected gain to provide first and second control signals to said front and rear pressure chambers respectively to adjust the pressure of the working fluid in the variable pressure chambers to suppress the pitching motion of the vehicle body; and a gain selector which manually changes magnitude of said gain.

14. A system as set forth in claim 13, wherein the first and second control signals each has a preselected signal level of a polarity opposite the other, said controller outputting the first and second control signals to said front and rear pressure means respectively to increase and decrease the pressure of the working fluid in the variable pressure chambers for suppressing the pitching motion of the vehicle body.

* * * * *